July 1, 1958

K. R. NORTON 2,841,780

LIGHT CONDITION INDICATOR FOR VEHICLES

Filed June 20, 1956

INVENTOR.
KENNETH R. NORTON
BY
*Patrick D Beavers*
ATTORNEY.

July 1, 1958 K. R. NORTON 2,841,780
LIGHT CONDITION INDICATOR FOR VEHICLES
Filed June 20, 1956 2 Sheets-Sheet 2

INVENTOR.
KENNETH R. NORTON
BY
Patrick D. Beavers
ATTORNEY.

United States Patent Office 2,841,780
Patented July 1, 1958

2,841,780

LIGHT CONDITION INDICATOR FOR VEHICLES

Kenneth R. Norton, El Paso, Tex.

Application June 20, 1956, Serial No. 592,637

4 Claims. (Cl. 340—252)

This invention relates to improvements in signal or indicator devices, whereby certain conditions of electrical circuits, at any particular time, may be clearly indicated, and is particularly directed to an improved light condition indicating means for an automobile or vehicle lighting system.

The primary object of the present invention is to provide a practical and efficient indicating means, which is operative to indicate to the operator or driver of a motor vehicle the exact condition or certain conditions of the vehicle lighting system.

It is well-known that collisions between motor vehicles frequently occur because of defective lighting apparatus, the operator of the defective vehicle not being aware of the condition. It is a particularly hazardous condition, when a motor vehicle is in operation with only one headlight illuminated, since the driver or operator of an on-coming vehicle, particularly under adverse weather conditions or on a dark night, is unable to tell whether the second vehicle is an automobile or a motor cycle. Likewise, an unlighted rear or tail light of a vehicle presents extreme danger of the vehicle being struck from behind by another vehicle.

In such instances, the operator of the defective vehicle is usually unaware of the existence of such conditions. This is particularly true under adverse weather conditions, since in rain, mist or fog, the operator cannot clearly discern, whether or not both of the headlights are functioning properly, and the driver cannot be aware, from his driving position, of the operation or non-operation of the tail and stop lights.

Various devices have previously been proposed for detecting such defective light conditions and indicating the defects to the operator of the vehicle but such devices have not practically and effectively accomplished the desired end. Such devices have employed solenoids and electro-magnetic switches for controlling electric circuits of the indicating device, arranged so that every time the lights of the vehicle are switched on or off from bright to dim or vice versa, the contacts of the signalling devices are either opened or closed and the switches actuate their armatures against the forces of springs or gravity. Such devices generally include undue resistance in the lighting circuits. When it is considered that in the average case, the lights may be switched on or off thousands of times during the period of a year, and when it is further considered that the mechanical parts of such devices are necessarily of a delicate nature, then it is obvious that such devices are subjected to extreme wear and are likely to get out of line or adjustment. Such devices, also, cannot be produced at an economical figure for purchase by all drivers.

With the present invention, no solenoids, electromagnetic switches or the like are employed and a simple and economical means is provided for dependably and effectively indicating the operating condition of electrical wiring circuits of a motor vehicle. The present invention, generally considered, involves using the elements in each individual lamp bulbs as an indication of the lamp's condition by wiring in series therewith an indicator pilot lamp. Therefore, should any lamp element of the vehicle fail to operate or conduct current through it and its source of ground, then the indicator lamp associated with such lamp element of the vehicle cannot be illuminated as it too is dependent upon this particular connection for its source of ground. In this manner, it is impossible to receive a wrong indication as to whether or not the lamp in question is illuminated. Other malfunctions, such as open circuits, or a short in the wiring, are also detected by means of the present invention.

The present invention generally relates to a novel wiring arrangement, which is employed with the tail and head light groups of a motor vehicle and used in connection with indicator pilot lamps for such tail and head lamps and which involves the use of the elements of a double element bulb, that is not carrying current, as a ground for the indicator pilot lamp or the use of one lamp, that is not carrying current, as the ground for the indicator pilot lamp.

Another important object of this invention is to provide a wiring arrangement, for selectively testing the tail and head lamps of a motor vehicle.

Another important object of this invention is to provide a five pole dimmer switch, which is used in connection with the wiring arrangements, for enabling selective tests to be made of the operating condition of the head lamps of a motor vehicle.

The foregoing and ancillary objects are attained by this invention, the preferred wiring arrangement and preferred form of switch of which are set forth in the following description and illustrated in the accompanying drawings, wherein.

Figures 1, 2:
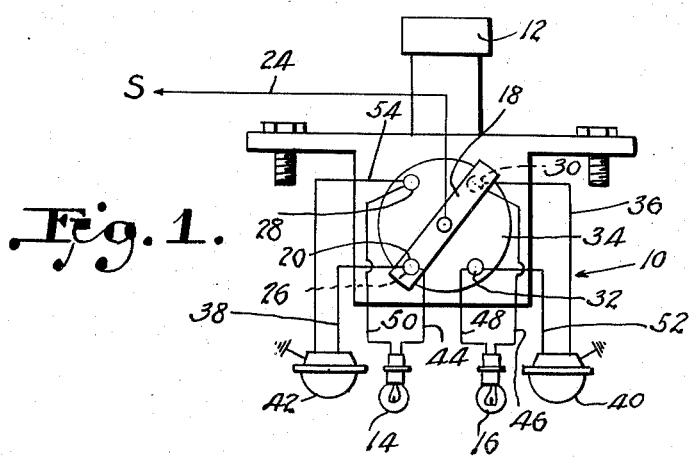
Figure 1 is a diagrammatic showing of a wiring arrangement and five pole dimmer switch, which is used in connection with testing the head lamps of a motor vehicle.
Figure 2 is a diagrammatic showing of a wiring arrangement used for testing the condition of the stop and tail light of a motor vehicle.
Figure 3:
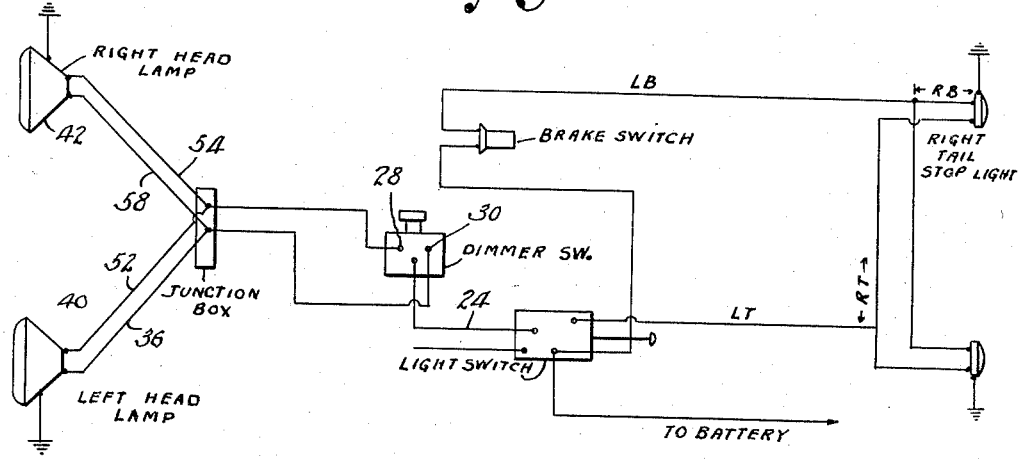
Figure 3 is a full diagrammatic view showing a conventional automobile wiring system.
Figure 4:
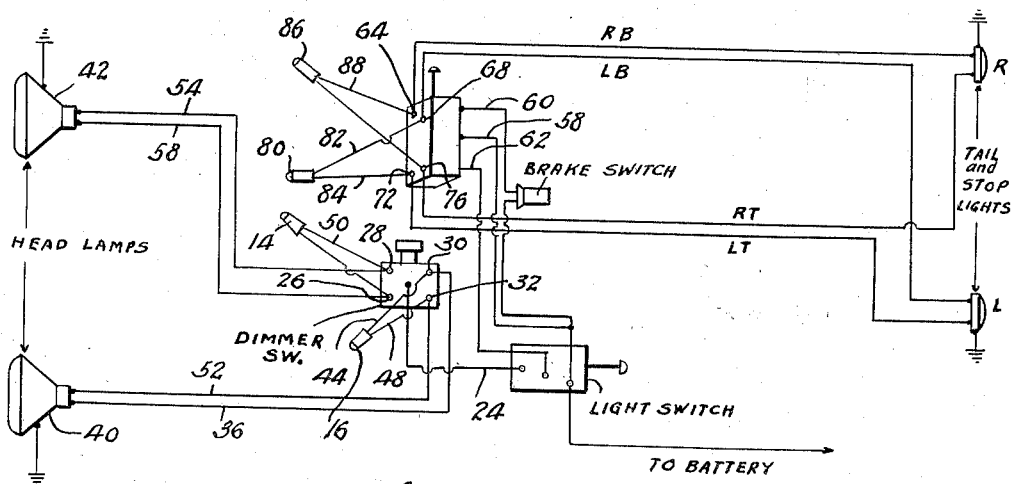
Figure 4 is a full diagrammatic view of an automobile wiring system showing the present invention installed and the system modified to accommodate the same.

Referring now more particularly to the drawing, and initially to Figure 1 for a detailed consideration of the five pole dimmer switch assembly 10 and the wiring arrangement, the indicating means include a bulb housing 12, which is adapted to be mounted on the dash board of a vehicle and in which indicator pilot lamps 14 and 16 are housed.

The dimmer switch 10 includes a rotatable contact strip 18, which has opposing contact ends 20 and 22. A line 24 is connected to the center of the strip and leads from a source of current, such as the battery in the vehicle. Fixed contacts or poles 26, 28, 30 and 32 are arranged in spaced fashion on a non-conductor plate 34 and are spaced diagonally apart, that is the contacts 26 and 30 are diagonally opposed, while the contacts 28 and 32 are diagonally opposed. The contacts 26 and 30 are grouped to be simultaneously engaged by the contacts of the movable strip 18, while the contacts 28 and 32 are also grouped so as to be simultaneously engaged by the contact strip.

When the contact strip is in the position, shown in Figure 1, the contacts 26 and 30 are engaged by the strip, whereas fixed contacts 28 and 32, which are suitably insulated one from the other and from the contacts 26 and 30, are not engaged by the contact strip. In such position of the contact strip, current is conducted from the source through the line 24 to the contact strip and passes out to the poles or fixed contacts 26 and 30, from where it goes out through lines 36 and 38 to the high element or the bright light filaments of head lights 40 and 42. As this happens, current is supplied to lines 44 and 46, which are wired to the indicator bulbs 14 and 16. The current passes through the bulbs and through lines 48 and 50 to the contacts 28 and 32, from whence the current passes through lines 52 and 54, the lines 52 and 54 being grounded to the dim light filaments of the head lamps 40 and 42, so as to complete the circuit. With the completion of the circuit, as aforedescribed, the indicator lamps 14 and 16 will be illuminated, thereby indicating that the dim light elements are in working condition. If, for any reason, such as a broken lamp element, or an open circuit, between the lamp and the source of power, the circuit cannot be grounded and, therefore, the indicator lamp will fail to light up, whereby a malfunction of the head lights is indicated.

The contact strip is actuated by the conventional dimmer switch of the vehicle and in the event, that the driver cannot tell which set of lights is on at the time, it is only necessary to look at the indicator lamp of the dimmer switch, or "high-low" beam, with which all motor vehicles are equipped.

A simple actuation of the dimmer switch will permit the driver to check the condition of both the high and low elements of the head lamps in the matter of a few seconds.

To check the high beams, the dimmer switch is actuated so as to rotate the contact strip 18 to a position where it will make contact with the fixed contact points 28 and 32 and will free the fixed contacts 26 and 30. In such position of the contact strip, the dim elements of the head lamps 40 and 42 are supplied with current through the lines 54 to head lamp 42 and through the line 52 to the head lamp 40. At the same time, current is supplied to lines 48 and 50 which lines conduct the current to the indicator lamps 14 and 16, from where it passes through the lamp elements to lines 44 and 46, past the fixed contacts 26 and 30 and through lines 38 and 36 to the ground through the elements of the high beam side of the head lamps.

A switch means 56 is generaly illustrated in Figure 2 for use in checking the operative condition of the tail light and stop lights in a motor vehicle. The same wiring arrangement is used, in that the elements of the tail light are used as the ground for the indicating circuit, when the tail lights are being checked and current is flowing only to the stop lights. Conversely stated, the elements of the stop light serve as the ground, when the stop lights are being checked, the current is flowing only to the tail lights. In other words, with the head lamps, the high and low filaments are alternately used as the ground for the circuits, when such filaments are being checked and the other filaments are being supplied with current. In the case of the rear stop light and tail lights, such light elements are alternately used as the ground, depending upon which of the elements is being checked.

Referring to Figure 2, the switch means 56 is generally illustrated, since any type of multiple pole switch of the push pull or rotary type may be used any may be manually actuated to selectively connect the contacts in the switch housing for selectively testing the tail lights and the stop lights. The contact post 58 is connected to the battery, while post 60 is connected to the line from the brake switch and post 62 is connected to the line from the light switch for the tail lights. Contact post 64 is connected to the right brake light 66 and contact post 68 is connected to the left brake light 70. Contact post 72 is connected to the left tail light 74 and contact post 76 is connected to the right tail light 78. The pilot indicator lamp 80 is attached by leads 82 and 84 to the posts 68 and 72 while the pilot indicator lamp 86 is attached by leads 88 and 90 to the posts 64 and 76.

When the switch is actuated to one of its positions, a circuit is established through the switch from contacts 58 and 60 to posts 64 and 68 and, thus, current is flowing to the stop lights 66 and 70. The elements of the tail lights 74 and 78 may then be checked. At such time, current is supplied to the indicator lamps 80 and 86 from the posts 64 and 68 and through the lines 84 and 90 to posts 72 and 76, from where the current passes to the tail lights 74 and 78. If the tail light elements are good, the circuit from the posts 64 and 68 will pass through the indicator lamps and the tail lamp elements, completing the ground and lighting the lamps. Should either tail lamp element, however, be broken, the circuit for that lamp, passing through the associated indicator bulb, will be disrupted and the indicator bulb for such defective lamp will fail to light, thereby indicating a bad or inoperative tail light. To check the stop lights, it is only necessary to actuate the switch so that no current goes to the stop lights and so that the current passes to the posts, 72 and 76. The tail lights then would be supplied power, as would the indicator bulbs 80 and 86, which would be using the elements of the stop lights for their source of ground. The operation is the same as explained above for the tail light condition determination.

The tail and stop lights may be checked at any time without fear of all of the lights going off during a test of the condition of the lights. The check may be made by simply actuating the switch to establish the desired current flow between the contact posts. The switch and indicator bulbs will preferably be mounted on the dashboard of the vehicle within easy reach of the driver so that the driver may conveniently keep a constant check on the stop and tail lights.

Thus, the present invention comprehends a novel wiring arrangement wherein the filaments of the bulb being tested serve as a source of ground for the indicator lamp, which is supplied with current from a contact for an energized lamp.

While the best known form of wiring arrangement and switch means have been set forth in the foregoing and illustrated in the attached drawing, other forms may be realized as coming within the scope of the invention, defined by the attached claims.

I claim:

1. An indicating system for indicating the operable condition of vehicle head lamps each having bright and low light filaments comprising: a source of electrical energy, a power circuit connecting one set of light filaments with the source, a pair of testing circuits each including a pilot indicator lamp, said pilot lamps each being connected in series to the filaments not energized, said testing circuits each being connected to the source, and switch means selectively closing the testing circuits to the light filaments not energized by the power circuit so as to test said last-named filaments.

2. A device as defined in claim 1 wherein said switch means includes diagonally opposing pairs of fixed contacts insulated from each other, conducting lines connecting said fixed contacts to the light filaments and a movable contact strip connected to the source and selectively engageable with the contacts of each pair.

3. A device as defined in claim 2 wherein said movable contact strip is rotatable.

4. An indicator system for a lamp having two light filaments comprising: a source of power, a power circuit selectively connecting the light filaments to the source, a pair of testing circuits each including a pilot indicator lamp and one of the light filaments, and switch means selectively closing the testing circuits to one of the filaments.

References Cited in the file of this patent

UNITED STATES PATENTS

| | | |
|---|---|---|
| 1,564,614 | Ogram | Dec. 8, 1925 |
| 1,728,302 | Namet et al. | Sept. 17, 1929 |
| 2,486,599 | Hollins | Nov. 1, 1949 |